2,943,494

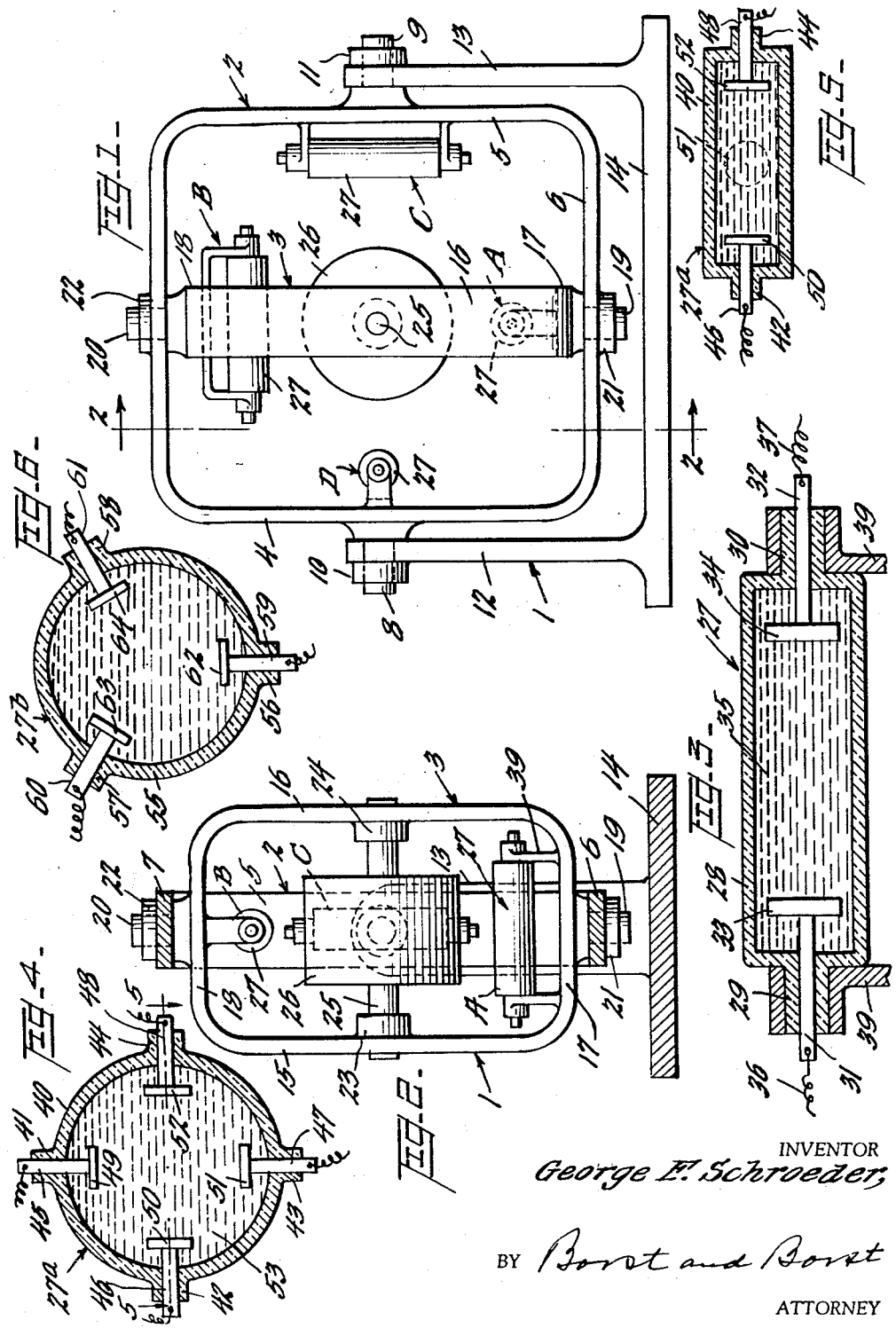

ELECTROLYTIC MASS SHIFT COMPENSATOR FOR GYROS

George F. Schroeder, Pines Lake, N.J., assignor to Sperry Rand Corporation, Ford Instrument Company Division, Wilmington, Del., a corporation of Delaware Filed Nov. 12, 1959, Ser. No. 852,528

16 Claims. (Cl. 74—5.4)

This invention relates generally to gyro mechanisms, and more specifically to the method and apparatus by which any mass shift therein, causing an unbalancing thereof, may be quickly and easily compensated for. The invention is especially adapted for use in small gyros such as used in guided missile guidance systems, but it is equally well adapted for use with other types of gyros.

One of the problems inherent in the building of extremely precise gyros is the precession due to the interaction of accelerations and a mass shift in the gyro which causes an unbalancing thereof. This mass shift in a gyro occurs when the effective mass of the entire gyro assembly moves off of the sensitive, or spinning, axis bearing of the gyro. Mass shifts equal to a movement of the entire wheel of a gyro by as little as one-millionth of an inch will produce drift rates, under normal acceleration, of one "g" which will be in the order of two-hundredths of a degree per hour. To compensate a gyro by producing a counterbalancing mass is an extremely difficult, precise, tedious and expensive operation as heretofore accomplished by shifting of the balancing screws of the gyro, such a procedure being of a trial and error nature. In the case of fluid floated gyros it is necessary to resort to extremely complex methods for gaining access to this adjusting screw through the fluid medium.

In accordance with my invention I provide a plurality of electrolytic elements which are permanently mounted in fixed position on the gyro mechanism and are utilized for compensating for an unbalancing of the gyro caused by any mass shift in the gyro mechanism. Each element comprises a small glass cylinder or other closed container which is filled with a nongas forming electrolyte, such as rhodium plating concentrate, and has two spaced aligned anodes rigidly mounting therein. The anodes are disposed in a plane passing through the geometrical center of the element and are equally spaced from the geometrical center of the element, one on each side thereof. By passing direct current through an element in one direction one anode will be plated with a small amount of metal, and by reversing direction of flow of current the other anode will be plated with a small amount of metal. Therefore by passing an electric current through the device in the proper direction the effective mass center of the device is shifted from one side of the center to the other. Assuming that a gyro wheel weighs about two pounds and its mass shift is in the order of one-millionth of an inch, the compensating countertorque necessary to restore balance is in the order of two-millions of a pound inch. By spacing the anode approximately two inches apart so that they have an effective radius from the center of rotation of the sensitive bearing of one inch, two-millionths of a pound will produce the required correcting torque. This amount of plating may be deposited on a selected anode in a bath such as rhodium plating concentrate in a few minutes.

In practice I preferably mount two elements on each gimbal, one on each side of the spin axis of the gyro mechanism. The two elements are disposed perpendicular to each other and are so positioned on the gimbal that the turning axis of the gimbal passes through the geometrical center of each of the elements. By so mounting the elements any unbalancing mass shift in the gyro mechanism, regardless of the character or direction thereof, may be quickly and easily compensated for by passing current in the proper direction through one or more of the elements.

In the case of gyros used in guided missiles it is possible that the gyros may have been fully energized for some time, but just prior to launching the missile, a drift of the gyro due to unbalance is discovered. With my device a correcting counterbalancing mass may be produced by applying the proper amount of ampere hours to one or more of the counterbalancing elements in the appropriate directions. Since no mechanically moving parts are employed once the correction is made it will remain highly stable under the environment of the missile.

It is therefore the principal object of the invention to provide means which is permanently incorporated in a gyro mechanism, and by which any unbalance thereof due to mass shift may be quickly and accurately compensated for.

Another object of the invention is to provide a compensating means of the aforesaid character which is entirely electric in operation and is devoid of any mechanically moving parts.

Having stated the principal objects of the invention, other and more limited objects thereof will be apparent from the following specification and the accompanying drawing forming a part thereof, in which:

Fig. 1 is a view in elevation diagrammatically illustrating a conventional two degree freedom gyro having the compensating counterbalancing mechanism of my invention applied thereto;

Fig. 2 is a vertical sectional view taken on the line 2—2 of Fig. 1;

Fig. 3 is an enlarged sectional view through one of the similar compensating counterbalancing elements of my invention;

Fig. 4 is a view similar to Fig. 3 showing a slightly modified form of the invention;

Fig. 5 is a sectional view taken on the line 5—5 of Fig. 4; and

Fig. 6 is a view similar to Figs. 3 and 4 showing another modified form of the invention.

Referring now to the drawings by reference characters, the numeral 1 indicates generally a conventional two degree freedom gyro having an outer gimbal 2 and an inner gimbal 3. The outer gimbal 2 comprises the side members 4 and 5 which are connected together at the lower ends thereof by a bottom member 6 and at the upper ends thereof by a top member 7. The side members 4 and 5 are provided with a pair of opposed horizontally aligned trunnions 8 and 9 by which the outer gimbal 2 is mounted for rotation about a horizontal axis between bearings 10 and 11 carried by the legs 12 and 13 which are secured to and extend upwardly from the base 14 of a supporting frame.

The inner gimbal 3 comprises the side members 15 and 16 which are connected together at the lower ends thereof by a bottom member 17 and at the upper ends thereof by a top member 18. The bottom and top members 17 and 18 of the inner gimbal 3 are provided with a pair of opposed vertically aligned trunnions 19 and 20 which extend into bearings 21 and 22 carried by the bottom and top members 6 and 7 respectively, of the outer gimbal 2 and by which the inner gimbal 3 is mounted for rotation about a vertical axis within the outer gimbal 2.

The side members 15 and 16 of the inner gimbal 3 are provided with a pair of horizontally aligned bearings 23 and 24 in which the shaft 25, on which the gyro wheel 26 is mounted, is rotatably mounted. The horizontal turn axis of the outer gimbal 2, the vertical turn axis of the inner gimbal 3, and the axis of the gyro wheel shaft 25, which is the spin axis of the gyro, all intersect at a common point which is the center of mass of the gyro wheel 26. The gyro wheel 26 is rotated by any suitable means, not shown, but which is preferably disposed within the gyro wheel.

Any shifting of mass in any element of the gyro will cause the effective mass of the entire gyro assembly to move off the center of the sensitive axis bearing of the gyro, and thereby cause an objectional precession. In order to compensate for any mass shift in the gyro, I provide a plurality of similar counterbalancing elements, generaly indicated by the numeral 27, and mount a pair thereof in fixed positions on each gimbal of the gyro.

Each counterbalancing element 27 comprises a closed glass cylinder 28 having a pair of axially aligned hubs 29 and 30, one at each end thereof. A conducting rod 31 extends into the cylinder 28 through the hub 29, and a similar conducting rod 32 extends into the cylinder 28 through the hub 30. The rod 31 has an anode 33 secured to the inner end thereof, and the rod 32 has a similar anode 34 secured to the inner end thereof. The cylinder 28 is filled with a suitable nongassing electrolytic plating solution 35 such as rhodium plating concentrate; and the rods 31 and 32 are connected to a source of direct current by conductors 36 and 37 respectively. The passing direct current into the solution 35 through the rod 31 and anode 33 and out through the anode 34 and rod 32 will effect plating of the anode 34 and deplating of the anode 33, the amount of plating being proportional to the length of time current is applied. In a like manner, the passing of direct current into the solution 35 through the rod 32 and the anode 34 and out through the anode 33 and rod 31 will effect plating of the anode 33 and deplating of the anode 34. It will therefore be seen that the center of mass of the counterbalancing element 27 can be shifted longitudinally in either direction as desired by passing direct current therethrough in the proper direction.

The counterbalancing elements 27 are secured in fixed positions on the gimbals 2 and 3 by means of brackets 39. As shown in Figs. 1 and 2 I permanently mount a pair of elements 27, designated A and B respectively, in fixed position on the inner gimbal 3, and a pair thereof, designated C and D respectively, in fixed position on the outer gimbal 2. The element A is secured to the bottom member 17 of the inner gimbal 3, with the axis thereof disposed horizontally in a medial plane passing through sides 15 and 16 and the turning axis of the inner gimbal 3; and the element C is secured to the side member 5, of the outer gimbal 2, with the axis thereof disposed vertically in a medial plane passing through the sides 4 and 5 and the turning axis of the outer gimbal 2. The element B is secured to the top member 18 of the inner gimbal 3 with the axis thereof disposed horizontally in a plane perpendicular to the plane of the axis of the element A; and the element D is secured to the side member 4 of the outer gimbal 2 with the axis thereof disposed horizontally in a plane perpendicular to the plane of the element C. The elements A and B are so positioned on the inner gimbal 3 that the turn axis thereof passes through the geometrical centers of both the elements A and B; and the elements C and D are so positioned on the outer gimbal 2 that the turn axis thereof passes through the geometrical centers of both the elements C and D. It will therefore be apparent that the shifting of the center of mass of one or more of the elements 27 in the proper direction will counteract and compensate for any mass shift in the gyro assembly.

In Figs. 4 and 5 I have shown a slightly modified form of compensating element, designated 27$^a$, which comprises a circular closed container 40 having four equally spaced outwardly extending hubs 41, 42, 43 and 44 integral therewith. Four radially extending conductor rods 45, 46, 47 and 48 are mounted in the hubs 41, 42, 43 and 44 respectively, with the inner ends thereof disposed within the container 40, and the outer ends thereof connected to a source of direct current. Anodes 49, 50, 51 and 52 are secured to the inner ends of the rods 45, 46, 47 and 48 respectively. The rods 45 and 47 with the anodes 49 and 51 carried thereby are disposed in axial alignment; and the rods 46 and 48 with the anodes 50 and 52 carried thereby are disposed in axial alignment perpendicular to the axis of the rods 45 and 47. The container 40 of the element 27$^a$ is filled with the same electrolytic nongassing plating solution 53 as the cylinder 28 of the element 27. By passing direct current through the solution 53 between the anodes 49 and 51 the center of mass of the element 27$^a$ may be shifted back and forth between the anodes 49 and 51 depending on the direction of flow of the current beween the anodes 49 and 51; and by passing direct current through the solution 53 between the anodes 50 and 52 the center of mass of the element 27$^a$ may be shifted back and forth between the anodes 50 and 52 depending on the direction of flow of the current between the anodes 50 and 52. It will therefore be apparent that by selectively passing current between the anodes 49 and 51 and between the anodes 50 and 52 as desired that the center of mass of the element 27$^a$ may be shifted radially in any direction about the geometrical center of the element 27$^a$.

When the elements 27$^a$ are used, instead of the elements 27, only one of them is mounted on each of the outer and inner gimbals 2 and 3 respectively, of the gyro mechanism 1. An element 27$^a$ may be mounted on either of the top or bottom members 17 or 18 of the inner gimbal 3 with one pair of axially aligned anodes 49 and 51, or 50 and 52 disposed horizontally in a medial plane passing through the sides 15 and 16 and the turning axis of the inner gimbal 3 and with the turning axis of the inner gimbal 3 intersecting the geometrical center of the element 27$^a$ mounted thereon; and an element 27$^a$ may be mounted on either of the side members 4 or 5 of the outer gimbal 2 with one pair of axially aligned anodes 49 and 51 or 50 and 52 disposed vertically in a medial plane passing through the side members 4 and 5 and the turning axis of the outer gimbal 2 and with the turning axis of the outer gimbal 2 intersecting the geometrical center of the element 27$^a$ mounted thereon. It will therefore be apparent that by selectively passing current through the solution 53 between axially aligned pairs of anodes in the two elements 27$^a$ that any unbalancing mass shift in the gyro mechanism, regardless of the character thereof, may be quickly and easily compensated for.

In Fig. 6, I have shown still another form of compensating element, designated 27$^b$, which comprises a circular closed container 55 having three equally spaced angularly disposed outwardly extending hubs 56, 57 and 58 integral therewith. Three radially extending conductor rods 59, 60 and 61 are mounted in the hubs 56, 57 and 58 respectively, with the inner ends thereof disposed within the container 55, and the outer ends thereof connected to a source of direct current. Anodes 62, 63 and 64 are secured to the inner ends of the rods 59, 60 and 61 respectively. The container 55 of the element 27$^b$ is filled with the same electrolytic nongassing plating solution 65 as the cylinder 28 of the element 27, and the container 40 of the element 27$^a$. Current may be selectively passed through the solution 65 from a selected one of the anodes 62, 63 or 64 to a selected other of the anodes; or current may be simultaneously passed from a selected one of the anodes 62, 63 or 64 to both of the other anodes. For example, current may be passed through the solution 65 from the anode 62 to the anode 63 in which case the anode 63 will be plated and the anode 62 deplated; or current may be passed from the anode 62 to the anode 64 in which case the anode 64 will be plated and the anode 62 deplated; or current may be simultaneously passed from the anode 62 to both the anodes 63 and 64, in which case both of the anodes 63 and 64 will be plated and the anode 62 deplated. Likewise current may be selectively passed from the anode 63 to either the anode 62 or 64, or simultaneously from the anode 63 to both the anodes 62 and 64. Also current may be selectively passed from the anode 64 to either the anode 62 or 63, or simultaneously from the anode 64 to both the anodes 62 and 63. It will therefore be apparent that, by variously passing current through the solution 65 from a selected one of the anodes 62, 63 or 64 to a selected other of the anodes or to both of the other anodes, the center of mass of the element 27ᵇ may be shifted radially in any direction, as desired, about the geometrical center of the element 27ᵇ.

As is the case with the element 27ᵃ, when the element 27ᵇ is used instead of the element 27, only one of them is mounted on each of the inner and outer gimbals of the gyro mechanism 1. An element 27ᵇ may be mounted on either of the top or bottom members 17 or 18 of the inner gimbal 3, and on either of the side members 4 or 5 of the outer gimbal 2. The arrangement of the anodes 62, 63 and 64 with respect to the turning axes of the gimbals 2 and 3 is immaterial, but the center of mass of the element 27ᵇ shoud be disposed in the axis of rotation of the gimbal on which the element is mounted.

When either of the compensating elements 27ᵃ or 27ᵇ is used, a compensating means for the entire mass of the element 27ᵃ or 27ᵇ, is preferably, but not necessarily, applied to the member opposite that on which the compensating member 27ᵃ or 27ᵇ is mounted. This compensating means could be a mass which is attached to the opposite member or which is formed integral with the opposite member.

From the foregoing it will be apparent to those skilled in this art that I have provided a very simple and efficient mechanism for accomplishing the objects of the invention.

It is to be understood that I am not limited to the specific constructions shown and described herein, as various modifications may be made therein within the spirit of the invention and the scope of the appended claims.

What is claimed is:

1. A gyro mechanism comprising a rotatably mounted gimbal, a gyro wheel rotatably mounted in said gimbal and a mass shift compensating and counterbalancing element mounted in fixed position on said gimbal, said counterbalancing element comprising a closed container, a plurality of spaced anodes mounted in fixed position in said container, means by which a direct current is selectively passed in either direction through said solution from one anode to another anode thereby deplating the said one anode and plating the said another anode to effect a longitudinal shifting of the center of mass of said counterbalancing element.

2. A gyro mechanism comprising an outer gimbal rotatably mounted in fixed supporting means for rotation about a horizontal axis, an inner gimbal rotatably mounted in said outer gimbal for rotation about a vertical axis, a gyro wheel rotatably mounted in said inner gimbal, and a mass shift compensating and counterbalancing element mounted in fixed position on each of said gimbals, each of said counterbalancing elements comprising a closed container, a plurality of spaced anodes mounted in fixed position in each of said containers, an electrolytic plating solution in each of said containers, means by which a direct current is selectively passed in either direction through said solution from one anode to another anode in each of said containers, thereby deplating the said one anode and plating the said another anode in each of said containers to effect a longitudinal shifting of the center of mass in each of said elements.

3. A mass shift compensating and counterbalancing element for a gyro mechanism, said compensating and counterbalancing element comprising a closed container, means by which said closed container is adapted to be mounted in fixed position on a gyro mechanism, a pair of spaced opposed axially aligned anodes mounted in fixed position in said container, an electrolytic plating solution in said contained, means by which a direct current is selectively passed in either direction through said solution from one anode to the other anode thereby deplating one of said anodes and plating the other of said anodes to effect a longitudinal shifting of the center of mass of said counterbalancing element.

4. A gyro mechanism comprising a gimbal, a gyro wheel mounted in said gimbal for rotation about a horizontal axis, means mounting said gimbal for rotation about a vertical axis; a mass shift counterbalancing and compensating element comprising a closed container, a pair of spaced opposed axially aligned anodes mounted in fixed position in said container, an electrolytic plating solution in said container; means mounting said element in fixed position on said gimbal with the geometrical center thereof disposed in the axis of rotation of said gimbal and with the axis of said anodes disposed parallel to the axis of rotation of said gyro wheel in a plane which includes the axis of rotation of said gyro wheel and the axis of rotation of said gimbal; and means by which a direct current is selectively passed in either direction through said solution from one anode to the other anode thereby deplating said one anode and plating the said another anode to effect a longitudinal shifting of the center of mass of said counterbalancing element.

5. A gyro mechanism comprising a gimbal, a gyro wheel mounted in said gimbal for rotation about a horizontal axis; a pair of similar mass shift counterbalancing and compensating elements each of which comprises a closed container, a pair of spaced opposed axially aligned anodes mounted in fixed position in said container, and an electrolytic plating solution in said container; means mounting one of said elements in fixed position on said gimbal with the geometrical center thereof disposed in the axis of rotation of said gimbal and with the axis of said anodes disposed parallel to the axis of rotation of said gyro wheel in a plane which includes the axis of rotation of said gyro wheel and the axis of rotation of said gimbal; means mounting the other of said elements in fixed position on said gimbal with the geometrical center thereof disposed in the axis of rotation of said gimbal and with the axis of said anodes disposed horizontally in a plane perpendicular to the plane which includes the axis of rotation of said gyro wheel and the axis of rotation of said gimbal; and means by which direct current is selectively passed in either direction through said solution from one anode or the other anode in each of said elements thereby deplating the said one anode and plating the said other anode to effect a longitudinal shifting of the center of mass in each of said counterbalancing elements.

6. A mass shift compensating and counterbalancing element which is adapted to be mounted in fixed position on a gyro mechanism, said element comprising a closed container, a first pair of spaced opposed axially aligned anodes mounted in fixed position in said container, a second pair of spaced opposed axially aligned anodes mounted in fixed position in said container with the axis thereof disposed perpendicular to the axis of said first pair of anodes, an electrolytic plating solution in said container, and means by which a direct current is selectively passed through said solution in either direction between one anode of each pair of anodes to the other anode thereof, thereby deplating one anode of each pair of anodes and plating the other anodes thereof to effect a radial shifting of the center of mass of said element in any direction.

7. A gyro mechanism comprising an outer gimbal, means mounting said outer gimbal in a fixed supporting means for rotation about a horizontal axis, an inner gimbal, a gyro wheel mounted in said inner gimbal for rotation about a horizontal axis, means mounting said inner gimbal in said outer gimbal for rotation about a vertical axis; a pair of similar mass shift counterbalancing and compensating elements each of which comprises a closed container, a plurality of spaced anodes mounted in fixed position in said container, an electrolytic plating solution in said container; means mounting one of said elements in fixed position in said inner gimbal with the geometrical center thereof disposed in the axis of rotation of said inner gimbal and with the axis of said anodes disposed parallel to the axis of rotation of said gyro wheel in a plane which includes the axis of rotation of said gyro wheel and the axis of rotation of said inner gimbal; means mounting the other element of said pair of elements on said outer gimbal with the geometrical center thereof disposed in the axis of rotation of said outer gimbal and with the axis of said anodes of said other element disposed perpendicular to the axis of rotation of said outer gimbal; and means by which a direct current is passed through the solution in each of said elements from one anode to another anode therein thereby deplating the said one anode in each of said elements and plating the said another anode in each of said elements to effect a longitudinal shifting of the center of mass in each of said elements.

8. A gyro mechanism comprising a gimbal, a gyro wheel mounted in said gimbal for rotation about a horizontal axis; a mass shift counterbalacing and compensating element comprising a closed container, a first pair of spaced opposed axially aligned anodes mounted in fixed position in said container, a second pair of spaced opposed axially aligned anodes mounted in fixed position in said container with the axis thereof disposed perpendicular to the axis of said first pair of anodes, an electrolytic plating solution in said container; means mounting said element on said gimbal with the geometrical center thereof disposed in the axis of rotation of said gimbal and with the axes of said first pair and said second pair of anodes disposed in a plane perpendicular to the axis of rotation of said gimbal; and means by which a direct current is selectively passed in either direction through said solution from one anode of said first pair of anodes to the other anode thereof, and from one anode of said second pair of anodes to the other anode thereof, thereby deplating the said one anodes and plating the said other anodes to effect a radial shifting of the center of mass of said elements in any direction.

9. A gyro mechanism comprising an outer gimbal, means mounting said outer gimbal in a fixed supporting means for rotation about a horizontal axis, an inner gimbal, a gyro wheel mounted in said inner gimbal for rotation about a horizontal axis, means mounting said inner gimbal in said outer gimbal for rotation about a vertical axis; a pair of similar mass shift counterbalancing and compensating elements each of which comprises a closed container, a first pair of spaced opposed axially aligned anodes mounted in fixed position in said container, a second pair of spaced opposed axially aligned anodes mounted in fixed position in said container with the axis thereof disposed perpendicular to the axis of said first pair of anodes, an electrolytic plating solution in said container; means mounting one of said elements on said inner gimbal with the geometrical center of said one element disposed in the axis of rotation of said inner gimbal and with the axes of said first and said second pairs of anodes disposed in a plane perpendicular to the axis of rotation of said inner gimbal; means mounting the other element of said pair of elements on said outer gimbal with the geometrical center of said other element disposed in the axis of rotation of said outer gimbal and with the axes of said first and second pairs of anodes of said other element disposed in a plane perpendicular to the axis of rotation of said outer gimbal; and means by which a direct current is selectively passed in either direction through the solution in each of said elements from one anode to another anode therein thereby deplating the said one anodes and plating the said other anodes to effect a radial shifting of the center of mass in any direction in each of said elements.

10. A gyro mechanism comprising a gimbal, a gyro wheel mounted in said gimbal for rotation about a horizontal axis, means mounting said gimbal for rotation about a vertical axis; a mass shift counterbalancing and compensating element comprising a closed container, a plurality of angularly disposed radially extending spaced apart anodes mounted in fixed positions in said container, an electrolytic plating solution in said container; means mounting said element in fixed position on said gimbal with the geometrical center thereof disposed in the axis of rotation of said gimbal and with the axes of said anodes disposed in a plane perpendicular to the axis of rotation of said gimbal; and means by which a direct current is passed through said solution from a selected one of said plurality of anodes to a selected other of said plurality of anodes thereby deplating said selected one anode and plating said selected other anode to effect a radial shifting of the center of mass of said element in any direction.

11. A gyro mechanism comprising a rotatably mounted gimbal, a gyro wheel rotatably mounted in said gimbal and a mass shift compensating and counterbalancing mechanism mounted in fixed position on said gimbal, said counterbalancing mechanism comprising a closed container, a plurality of angularly spaced radially extending anodes mounted in fixed position in said container, an electrolytic plating solution in said container, means by which a direct current is selectively passed in either direction through said solution from a selected one of said anodes to a selected another of said anodes thereby deplating said selected one of said anodes and plating the said selected another of said anodes to effect a shifting of the center of mass of said counterbalancing mechanism.

12. A gyro mechanism comprising an outer gimbal rotatably mounted in fixed supporting means for rotation about a horizontal axis, an inner gimbal rotatably mounted in said outer gimbal for rotation about a vertical axis, a gyro wheel rotatably mounted in said inner gimbal, and a mass shift compensating and counterbalancing mechanism mounted in fixed position on each of said gimbals, each of said counter-balancing mechanisms comprising a closed container, a plurality of angularly spaced radially extending anodes mounted in fixed position in said container, an electrolytic plating solution in said container, means by which a direct current is selectively passed in either direction through said solution from a selected one of said anodes to a selected another of said anodes thereby deplating said selected one of said anodes and plating the said selected another of said anodes to effect a shifting of the center of mass of said counterbalancing mechanism.

13. A mass shift compensating and counterbalancing mechanism for a gyro mechanism, said compensating and counterbalancing mechanism comprising a closed container, means by which said closed container is adapted to be mounted in fixed position on a gyro mechanism, a plurality of angularly spaced radially extending anodes mounted in fixed position in said container, an electrolytic plating solution in said container, means by which a direct current is selectively passed in either direction through said solution from a selected one of said anodes to a selected another of said anodes thereby deplating said selected one of said anodes and plating the said selected another of said anodes to effect a shifting of the center of mass of said counterbalancing mechanism.

14. A gyro mechanism comprising a rotatably mounted gimbal, a gyro wheel rotatably mounted in said gimbal and a mass shift compensating and counterbalancing mechanism mounted in fixed position on said gimbal, said counterbalancing mechanism comprising a closed container, three triangularly spaced anodes mounted in fixed position in said container, an electrolytic plating solution in said container, means by which a direct current is selectively passed through said solution from a selected one of said anodes to a selected another of said anodes thereby depleting said selected one of said anodes and plating the said selected another of said anodes to effect a shifting of the center of mass of said counterbalancing mechanism.

15. A mass shift compensating and counterbalancing mechanism for a gyro mechanism, said compensating and counterbalancing mechanism comprising a closed container, three triangularly spaced anodes mounted in fixed position in said container, an electrolytic plating solution in said container, means by which a direct current is selectively simultaneously passed from a selected one of said triangularly spaced anodes to the other two of said triangularly spaced anodes thereby depleting said selected one of said triangularly spaced anodes and plating the other two of said triangularly spaced anodes to effect a shifting of the center of mass of said counterbalancing mechanism.

16. A mass shift compensating and counterbalancing element which is adapted to be mounted in fixed position on a gyro mechanism, said element comprising a closed container, a plurality of angularly disposed radially extending spaced apart anodes mounted in fixed positions in said container, an electrolytic plating solution in said container, and means by which a direct current is passed through said solution from a selected one of said plurality of anodes to a selected other of said plurality of anodes thereby depleting said selected one anode and plating said selected other anode to effect a radial shifting of the center of mass of said element in any direction.

References Cited in the file of this patent

UNITED STATES PATENTS 2,859,626     Maze _____ Nov. 11, 1958

FOREIGN PATENTS 8,391     Great Britain _____ 1905

Notice of Adverse Decision in Interference

In Interference No. 92,178 involving Patent No. 2,943,494, G. F. Schroeder, Electrolytic mass shift compensator for gyros, final judgment adverse to the patentee was rendered Aug. 31, 1962, as to claim 3.

[*Official Gazette October 16, 1962.*]